H. S. GRIFFITHS.

Suspension-Rings.

No. 5,067.

Reissued Sep. 24, 1872.

Witnesses
E. G. Kastenhuber
A. Faber du Faur

Inventor.
Harry S. Griffiths
By Van Santvoord & Hauff
his attys

A.H. PHOTO-LITHOGRAPHIC CO. N.Y. (OSBORNE'S PROCESS.)

UNITED STATES PATENT OFFICE.

HARRY S. GRIFFITHS, OF BROOKLYN, NEW YORK, ASSIGNOR, BY MESNE ASSIGNMENTS, TO JOSEPHINE CARY AND CLEMENTINE GRIFFITHS.

IMPROVEMENT IN SUSPENSION-RINGS.

Specification forming part of Letters Patent No. 77,482, dated May 5, 1868; reissue No. 5,067, dated September 24, 1872.

*To all whom it may concern:*

Be it known that I, HARRY S. GRIFFITHS, of Brooklyn, in the county of Kings and State of New York, have invented a new and Improved Ring for Business-Cards; and I do hereby declare the following to be a full, clear, and exact description thereof, which will enable those skilled in the art to make and use the same, reference being had to the accompanying drawing forming part of this specification, in which drawing—

Figure 1:
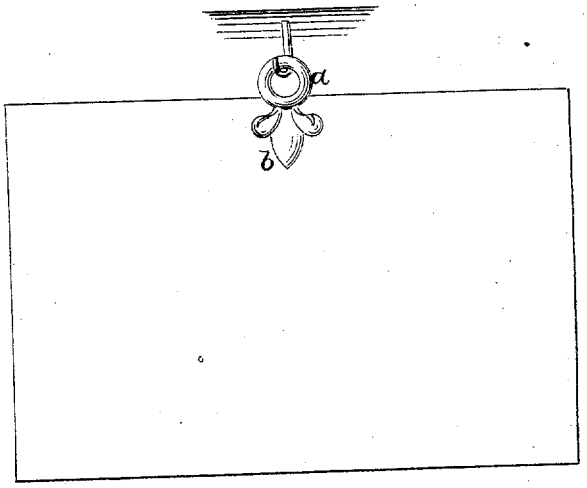
Figure 2:
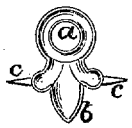
Figure 3:
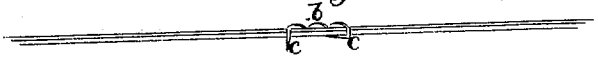
Figure 4:
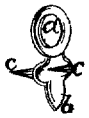

Figure 1 represents my improved device of a suspension-ring attached to a card to suspend it; Fig. 2 represents the same detached before the fastening-spurs are bent; Fig. 3 represents the same attached to a card with one of the fastening-spurs closed down; and Fig. 4 represents a perspective view when ready for use.

Similar letters indicate corresponding parts.

This invention relates to a new and useful device for attachment to business-cards by which they may be conveniently suspended against a wall for display and preservation. A common method of hanging or suspending unframed business-cards or show-cards for display is to tack them against a wall, by which the cards are injured and the wall defaced, so there is often objection made to placing them where they can be observed. My invention is designed to obviate this difficulty attending the display and preservation of business-cards and show-cards, and I accomplish this object by a very simple and cheap device, consisting of a ring with spurs, which is stamped out of thin sheet metal, the spurs being inserted and fastened in the edge of a card and the ring hung on a nail or pin against the wall, as shown in Fig. 1.

My suspension-ring consists of a ring, *a*, having a bottom piece, *b*, provided with spurs *c c*, one or more, which are passed through a card and turned down on the opposite side to secure them to the same. The suspension-ring, with its fastening spur or spurs, is produced in one piece out of thin sheet metal—as, for example, thin sheet-brass or other suitable metal—by being stamped or struck up from said metal with a die of the desired shape to produce the form required for the several parts. The metal may be embossed or struck up in any ornamental design which it may be desired to give to the fastener.

What I claim as new, and desire to secure by Letters Patent, is—

1. A suspension-ring for business-cards, constructed and employed substantially as and for the purpose herein described.

2. A suspension-ring provided with fastening-projections, one or more, made in one piece with said ring, substantially as set forth.

HARRY S. GRIFFITHS.

Witnesses:
W. HAUFF,
E. F. KASTENHUBER.